US012756265B2

(12) United States Patent
Kobune et al.

(10) Patent No.: US 12,756,265 B2
(45) Date of Patent: Oct. 6, 2026

(54) MOTOR DEVICE, METHOD OF MANUFACTURING MOTOR DEVICE, TERMINAL CONNECTION MECHANISM, TERMINAL CONNECTION METHOD, AND ELECTRIC BRAKE DEVICE

(71) Applicant: Hitachi Astemo, Ltd., Hitachinaka (JP)

(72) Inventors: Tatsuro Kobune, Hitachinaka (JP); Hikaru Morita, Hitachinaka (JP); Takatoshi Hattori, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 241 days.

(21) Appl. No.: 18/569,376

(22) PCT Filed: Jun. 2, 2022

(86) PCT No.: PCT/JP2022/022484
§ 371 (c)(1),
(2) Date: Dec. 12, 2023

(87) PCT Pub. No.: WO2022/264825
PCT Pub. Date: Dec. 22, 2022

(65) Prior Publication Data

US 2024/0266906 A1 Aug. 8, 2024

(30) Foreign Application Priority Data

Jun. 15, 2021 (JP) ................................. 2021-099232

(51) Int. Cl.
*H02K 5/22* (2006.01)
*H02K 15/14* (2025.01)
*H02K 15/32* (2025.01)

(52) U.S. Cl.
CPC ............. *H02K 5/225* (2013.01); *H02K 15/14* (2013.01); *H02K 15/32* (2025.01); *H02K 2203/09* (2013.01)

(58) Field of Classification Search
CPC .......... H02K 5/22; H02K 5/225; H02K 15/14; H02K 15/32; H02K 2203/09
See application file for complete search history.

(56) References Cited

U.S. PATENT DOCUMENTS

2007/0178723 A1* 8/2007 Kataoka ............... H05K 1/0263 439/76.2
2011/0275231 A1 11/2011 Nagano et al.
(Continued)

FOREIGN PATENT DOCUMENTS

EP 3 223 375 9/2017
JP 2012-138243 7/2012
(Continued)

OTHER PUBLICATIONS

Toyama, Machine Translation of JP2016004616, Jan. 2016 (Year: 2016).*
(Continued)

*Primary Examiner* — Eric Johnson
(74) *Attorney, Agent, or Firm* — Wenderoth, Lind & Ponack, L.L.P.

(57) ABSTRACT

Cover-side terminals of a motor cover are electrically press-fitted over and fixed to motor terminals of a motor case at a first position which is separate from a base portion by a first length in an extending direction of the motor terminals. A fixing portion of the motor cover is press-fitted over and fixed to a protruding portion at a second position which is separate from the base portion by a second length which is different from the first length in the extending direction of the motor terminals.

5 Claims, 4 Drawing Sheets

(56) References Cited

U.S. PATENT DOCUMENTS

| | | | | |
|---|---|---|---|---|
| 2012/0178303 | A1 | 7/2012 | Sakurai | |
| 2017/0373451 | A1* | 12/2017 | Asada | H02K 5/225 |

FOREIGN PATENT DOCUMENTS

| | | | |
|---|---|---|---|
| JP | 2013116000 A | * | 6/2013 |
| JP | 2016-004616 | | 1/2016 |
| JP | 2016-161025 | | 9/2016 |
| JP | 2017-046405 | | 3/2017 |
| JP | 2019-130939 | | 8/2019 |
| JP | 2020-008134 | | 1/2020 |
| WO | 2010/113243 | | 10/2010 |

OTHER PUBLICATIONS

Kokubu, Machine Translation of JP2013116000, Jun. 2013 (Year: 2013).*

International Search Report issued Aug. 2, 2022 in International Application No. PCT/JP2022/022484, with English Translation.

Written Opinion of the International Searching Authority issued Aug. 2, 2022 in International Application No. PCT/JP2022/022484, With English Translation.

Extended European Search Report issued Sep. 30, 2024 in corresponding European Patent Application No. 22824817.5.

Office Action dated May 8, 2026 in Indian Patent Application No. 202317083214.

* cited by examiner

MOTOR DEVICE, METHOD OF MANUFACTURING MOTOR DEVICE, TERMINAL CONNECTION MECHANISM, TERMINAL CONNECTION METHOD, AND ELECTRIC BRAKE DEVICE

CROSS-REFERENCE TO RELATED APPLICATION

The present application claims priority based on Japanese Patent Application No. 2021-099232 filed on Jun. 15, 2021. All disclosed contents including the Specification, Scope of Claims, Drawings, and Abstract of Japanese Patent Application No. 2021-099232 are incorporated herein by reference in their entirety.

TECHNICAL FIELD

The present disclosure relates to a motor device, a method of manufacturing a motor device, a terminal connection mechanism, a terminal connection method, and an electric brake device.

BACKGROUND ART

In Patent Literature 1, there is disclosed a motor that allows press-fitted states of a plurality of terminals to be individually managed based on a press-fit load. In this motor, protrusion heights of bus bars with respect to a surface of the motor are all different from each other. Thus, timings of press-fitting terminal portions into slits of the bus bars are also all different from each other. Each time the press-fitting of the terminal portion into a corresponding one of the slits is started, an inclination of a load detected through a load sensor changes. Specifically, the press-fitted states of three terminal portions are individually reflected in the detected load as a change in inclination. Thus, the press-fitted state of each of the terminal portions can be managed based on the load. Further, for example, in Patent Literature 2 to Patent Literature 4, there is described an electric brake device that applies a braking force based on driving of a motor.

CITATION LIST

Patent Literature

PTL 1: JP 2016-004616 A
PTL 2: JP 2016-161025 A
PTL 3: JP 2019-130939 A
PTL 4: JP 2020-008134 A

SUMMARY OF INVENTION

Technical Problem

Incidentally, when a "press-fit timing for a motor terminal and an electrical connection terminal" and a "press-fit timing for a press-fit portion for mechanical fixing of a motor to a housing" are set to substantially the same timing, the load is generated at substantially the same timing. As a result, there is a fear in that whether or not the motor terminal and the electrical connection terminal have correctly been fitted together cannot be checked. Meanwhile, in Patent Literature 1, there is disclosed that the press-fitted states of the terminal portions are managed based on the load by setting press-fit timings different for a plurality of terminals. However, the influence of setting press-fit timings different for two areas having different functions described above is not taken into consideration.

An object of one embodiment of the present invention is to provide a motor device, a method of manufacturing a motor device, a terminal connection mechanism, a terminal connection method, and an electric brake device, which enable suppression of degradation of a fitted state between a terminal (for example, a motor terminal) and an electrical connection portion (electrical connection terminal) when press-fitting is performed in two areas having different functions.

Solution to Problem

According to one embodiment of the present invention, there are provided a motor device and an electric brake device including the motor device, the motor device including: a motor case; and a motor cover, wherein the motor case includes: a motor; a terminal connected to the motor; and a case main body in which the motor is housed, the case main body including a base portion from which the terminal extends and a protruding portion protruding from the base portion, and wherein the motor cover includes: an electrical connection portion that is electrically press-fitted over and fixed to the terminal at a first position being separate from the base portion by a first length in an extending direction of the terminal; and a fixing portion that is press-fitted over and fixed to the protruding portion at a second position being separate from the base portion by a second length being different from the first length in the extending direction of the terminal.

Further, according to one embodiment of the present invention, there is provided a method of manufacturing a motor device, the method including: a first step of preparing a motor case, the motor case including: a motor; a terminal connected to the motor; a case main body in which the motor is housed, the case main body including a base portion from which the terminal extends and a protruding portion protruding from the base portion; a second step of preparing a motor cover, the motor cover including: an electrical connection portion to be electrically fixed to the terminal; and a fixing portion to be press-fitted over and fixed to the protruding portion; and a third step of fixing the motor case and the motor cover to each other so that a first press-fit timing of press-fitting the terminal into the electrical connection portion in an extending direction of the terminal and a second press-fit timing of press-fitting the protruding portion into the fixing portion in the extending direction of the terminal are set different from each other.

Further, according to one embodiment of the present invention, there is provided a terminal connection mechanism, including: a first housing; and a second housing, wherein the first housing includes: a terminal; a base portion from which the terminal extends; and a protruding portion protruding from the base portion, and wherein the second housing includes: an electrical connection portion that is electrically press-fitted over and fixed to the terminal at a first position being separate from the base portion by a first length in an extending direction of the terminal; and a fixing portion that is press-fitted over and fixed to the protruding portion at a second position being separate from the base portion by a second length being different from the first length in the extending direction of the terminal.

In addition, according to one embodiment of the present invention, there is provided a terminal connection method, the method including: a first step of preparing a first housing, the first housing including: a terminal; a base portion from which the terminal extends; and a protruding portion protruding from the base portion; a second step of preparing a second housing, the second housing including: an electrical connection portion to be electrically fixed to the terminal; and a fixing portion to be press-fitted over and fixed to the protruding portion; and a third step of fixing the first housing and the second housing to each other so that a first press-fit timing of press-fitting the terminal into the electrical connection portion in an extending direction of the terminal and a second press-fit timing of press-fitting the protruding portion into the fixing portion in the extending direction of the terminal are set different from each other.

According to one embodiment of the present invention, the degradation of the fitted state between the terminal (for example, the motor terminal) and the electrical connection portion (the electrical connection terminal) when press-fitting is performed in the two areas having different functions can be suppressed.

DESCRIPTION OF EMBODIMENTS

Now, a motor device (terminal connection mechanism) according to an embodiment is described with reference to the accompanying drawings, taking the motor device mounted in an electric brake device for a four-wheel vehicle as an example.

Figure 1:
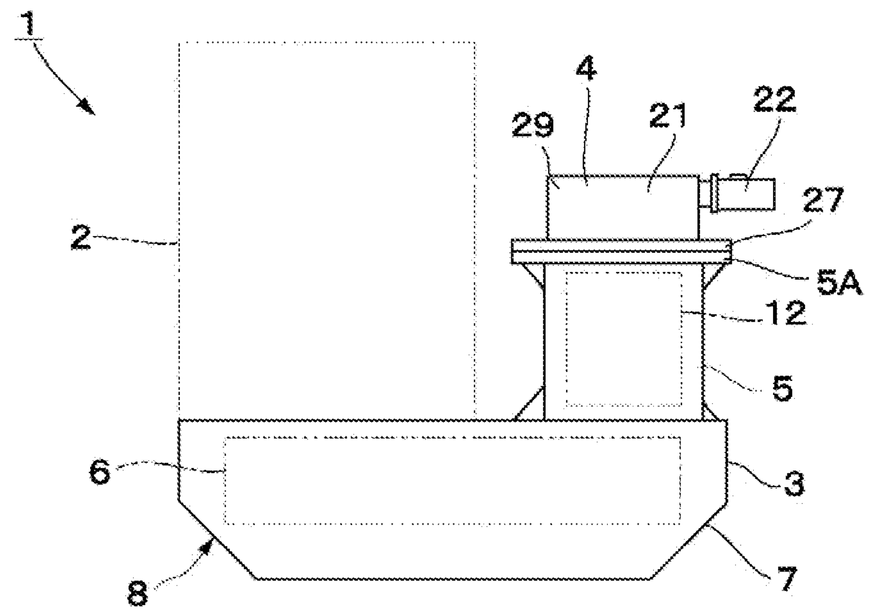
FIG. 1 is an outline view for illustrating an electric brake device including a motor device (terminal connection mechanism) according to an embodiment of the present invention.

FIG. 1 to FIG. 4 show the embodiment. In FIG. 1, an electric brake device 1 corresponds to, for example, a hydraulic disc brake including an electric motor (hydraulic disc brake having an electric parking brake function). The electric brake device 1 is mounted in a vehicle (automobile) (not shown). The electric brake device 1 includes a brake main body unit 2 and an electric actuator unit 3.

The brake main body unit 2 includes, for example, a mounting member, a caliper, a pair of brake pads, and a piston. The mounting member is referred to as "carrier". The caliper serves as a wheel cylinder. The pair of brake pads serves as braking members (friction members, friction pads). The piston serves as a pressing member. In this case, the caliper and the piston form a cylinder mechanism. Specifically, in the cylinder mechanism, the piston is hydraulically moved to press the brake pads against a disc rotor. The brake main body unit 2 corresponds to a hydraulic brake mechanism (hydraulic brake) that hydraulically presses the brake pads against the disc rotor to apply a braking force. The disc rotor serving as a member to be braked (rotary member) is rotated together with a wheel of the vehicle.

The electric actuator unit 3 includes a motor device 4, a motor-device cover 5, a speed reducer 6, a speed-reducer cover 7, and a rotary-to-linear motion conversion mechanism. The motor device 4 includes a motor 12 (a coil and a permanent magnet) serving as a thrust source (drive source) for thrusting the piston of the brake main body unit 2. The motor-device cover 5 is a cover member for the motor device 4. The motor-device cover 5 isolates a motor case 11 (motor 12) of the motor device 4 from outside air and holds the motor case 11. The motor-device cover 5 has a flange portion 5A. A flange portion 27 of a motor cover 21 of the motor device 4 is screwed to the flange portion 5A of the motor-device cover 5 with use of a screw (not shown). As a result, the motor device 4 is held on the motor-device cover 5.

The speed reducer 6 is formed of, for example, a gear-type speed reducer. The speed reducer 6 transmits rotation of the motor 12 to the rotary-to-linear motion conversion mechanism after reducing a speed of the rotation. The speed-reducer cover 7 is a cover member for the speed reducer 6. The speed-reducer cover 7 isolates the speed reducer 6 from outside air and holds the speed reducer 6. Specifically, a plurality of gears of the speed reducer 6 are rotatably supported inside the speed-reducer cover 7. The motor-device cover 5 and the speed-reducer cover 7 may be formed, for example, separately from each other or integrally as one cover. As illustrated in FIG. 1, the motor device 4, the speed reducer 6, the motor-device cover 5, and the speed-reducer cover 7 form a motor gear unit 8 corresponding to an assembly of the above-mentioned components.

The rotary-to-linear motion conversion mechanism is also referred to as "rotary-to-linear motion mechanism", and is provided in, for example, the piston of the brake main body unit 2. The rotary-to-linear motion conversion mechanism forms a holding mechanism (pressing-member holding mechanism) that maintains a pressing force of the brake pads. The rotary-to-linear motion conversion mechanism includes, for example, a screw member and a linearly movable member. The screw member is formed of a male-threaded bar-shaped body. The linearly movable member serves as a thrust member having a female-threaded hole on an inner periphery side. The rotary-to-linear motion conversion mechanism converts the rotation of the motor 12 into displacement of the piston in an axial direction and holds the piston thrusted by the motor 12.

In the embodiment, the electric brake device 1 thrusts the piston with a brake hydraulic pressure generated based on, for example, an operation of the brake pedal and presses the disc rotor with the brake pads to thereby apply a braking force to the wheel and in turn to the vehicle. In addition, the electric brake device 1 thrusts the piston through intermediation of the rotary-to-linear motion conversion mechanism with use of the motor 12 in response to an actuation request issued based on, for example, a signal from a parking brake switch to apply a braking force (parking brake, auxiliary brake used during traveling) to the vehicle. In order to apply a braking force, the electric brake device 1 includes the motor device 4. Basic configurations of the brake main body unit 2 and the electric actuator unit 3 of the electric brake device 1 are publicly known from various patent literatures including Patent Literatures 2 to 4 mentioned above. Thus, a further description about the basic configurations is omitted.

Further, in the embodiment, the hydraulic disc brake including the electric motor is described as an example of the electric brake device 1. However, the electric brake device 1 is not limited thereto. For example, an electric disc brake, an electric drum brake, a disc brake, or a cable-puller type electric parking brake may be used. The electric disc brake includes an electric caliper. The electric drum brake presses shoes against a drum with use of an electric motor so as to apply a braking force. The disc brake includes an electric drum parking brake. The cable-puller type electric parking brake is a parking brake that is actuated to be applied when a cable is pulled with use of an electric motor. Specifically, various kinds of electric brakes (electric brake mechanisms) can be used as the electric brake device 1 as long as friction members (pads, shoes) are pressed (thrust) against a rotary member (rotor, drum) based on driving of an electric motor so as to maintain and release a pressing force.

Next, the motor device 4 serving as the terminal connection mechanism is described with reference to FIG. 2 to FIG. 4 along with FIG. 1.

Figure 2:
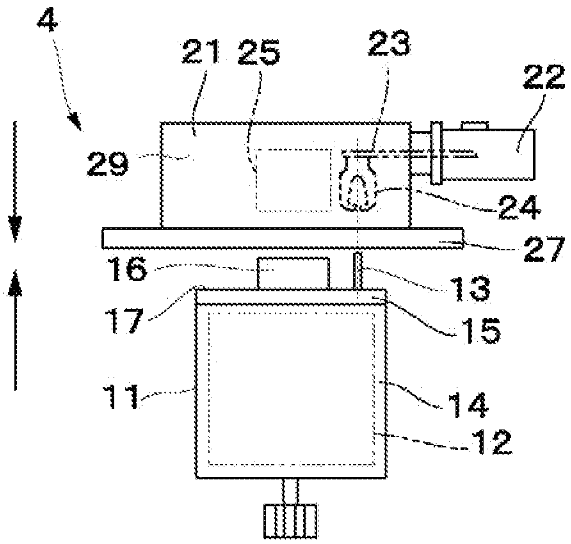
FIG. 2 is an outline view for illustrating the motor device (terminal connection mechanism) removed from the electric brake device illustrated in FIG. 1, in which a motor case (first housing) and a motor cover (second housing) are separated from each other.

As illustrated in FIG. 2, the motor device 4 includes the motor case 11 and the motor cover 21. The motor case 11 corresponds to a first housing. The motor cover 21 corresponds to a second housing. In FIG. 2, the motor case 11 and the motor cover 21 of the motor device 4 are separated from each other. Specifically, in FIG. 2, there is illustrated a state before the motor case 11 and the motor cover 21 are fixed together (before mounting). Meanwhile, in FIG. 1, there is illustrated the motor device 4 incorporated into the electric brake device 1 (more specifically, the motor gear unit 8) after the motor case 11 and the motor cover 21 are fixed together.

Specifically, in FIG. 1, there is illustrated the motor device 4 in which the motor case 11 and the motor cover 21 have been fixed together is mounted onto the motor-device cover 5 of the electric brake device 1 (more specifically, the motor gear unit 8). This mounting can be achieved by screwing the flange portion 27 of the motor cover 21 of the motor device 4 and the flange portion 5A of the motor-device cover 5, which are held in abutment against each other, together with use of a screw (not shown).

As illustrated in FIG. 2, the motor case 11 of the motor device 4 includes the motor 12, motor terminals 13, and a case main body 14. The motor terminals 13 correspond to terminals. The motor 12 includes, for example, a stator and a rotor. The stator includes a coil. The rotor is provided rotatably in a center of the stator and includes a permanent magnet. However, the rotor may include a coil, and the stator may include a permanent magnet.

The motor terminals 13 are connected to the motor 12. The motor terminals 13 are connected to, for example, the coil of the motor 12. The motor terminals 13 are connected to cover-side terminals 24 of the motor cover 21 by press-fitting. The motor terminals 13 are each formed as, for example, a flat plate-shaped terminal. Electric power is supplied to the motor 12 (coil) via the cover-side terminals 24 and the motor terminals 13. The case main body 14 houses the motor 12 therein. In other words, the motor 12 is housed in the case main body 14.

The case main body 14 includes a base portion 15 and a protruding portion 16. The base portion 15 closes one end of the case main body 14, specifically, one side facing the motor cover 21. The motor terminals 13 extend from the base portion 15. Specifically, the motor terminals 13 extend from the base portion 15 toward the motor cover 21. The protruding portion 16 protrudes from the base portion 15. Specifically, the protruding portion 16 protrudes from the base portion 15 toward the motor cover 21. The protruding portion 16 is formed as, for example, a round-columnar member on the base portion 15. The base portion 15 is press-fitted and fixed into a fixing portion 25 of the motor cover 21.

Meanwhile, the motor cover 21 serving as a motor cap has a function of holding the motor 12. The motor cover 21 is formed by, for example, resin molding and has a bottomed cylindrical shape as a whole. A motor device-side connector 22 to which a vehicle-side connector is fitted is provided to the motor cover 21. Further, the motor cover 21 has the flange portion 27 that is brought into abutment against the flange portion 5A of the motor-device cover 5 when the motor device 4 is mounted onto the motor-device cover 5. The flange portion 27 of the motor cover 21 and the flange portion 5A of the motor-device cover 5 are screwed together with use of, for example, a screw (not shown).

A conductive member 23 having electrical conductivity for allowing power feeding to the motor 12 is insert-molded into the motor cover 21. One end corresponding to one side of the conductive member 23 has a flat-plate shape that allows connection to the vehicle-side connector. Another end corresponding to another side of the conductive member 23 has the cover-side terminals 24 corresponding to connecting portions to the motor terminals 13 of the motor 12. The cover-side terminals 24 are also referred to as, for example, "bus bars", and are each formed as an alligator connection terminal (alligator terminal). Specifically, the cover-side terminals 24 are each formed as, for example, a flat plate-shaped terminal and each have a cutout portion. When the motor terminals 13, each having a plate shape, are inserted into the cutout portions, the motor terminals 13 are press-fitted into the cover-side terminals 24. Thus, the cover-side terminals 24 are each formed in a substantially U-like or substantially Y-like shape as a whole.

The cover-side terminals 24 are electrically connected to the motor terminals 13 and are press-fitted over and fixed to the motor terminals 13. Specifically, the cover-side terminals 24 and the motor terminals 13 are electrically connected to each other by press-fitting between the terminals. Further, a mechanical connection between the motor case 11 including the motor 12 and the motor cover 21 is achieved in a connection area that is different from connection areas (electrical connection areas) in which the cover-side terminals 24 and the motor terminals 13 are connected to each other. Specifically, when the protruding portion 16 of the motor case 11 and the fixing portion 25 of the motor cover 21 are press-fitted and fixed (press-fitted and engaged) together, the motor case 11 and the motor cover 21 are held.

As described above, the motor cover 21 includes the cover-side terminals 24 and the fixing portion 25. The cover-side terminals 24 correspond to electrical connection portions that are electrically press-fitted over and fixed to the motor terminals 13 of the motor case 11. The fixing portion 25 is press-fitted over and fixed to the protruding portion 16 of the motor case 11. Electrical connections are achieved by press-fitting the motor terminals 13 into fitting portions of the cover-side terminals 24, each having an alligator shape. The fitting portions of the cover-side terminals 24 correspond to portions that are each narrower than a plate thickness of each of the motor terminals 13.

Meanwhile, the mechanical connection is achieved by press-fitting and engaging the protruding portion 16 of the motor case 11, which has a round-columnar shape, into the fixing portion 25 having a cylindrical shape formed in the motor cover 21. In this case, as illustrated in FIGS. 3, a plurality of ribs 26 are formed on an inner side of the fixing portion 25 of the motor cover 21 so as to be separate apart from each other in a circumferential direction in such a manner that an inner-diameter dimension of the fixing portion 25 becomes smaller than an outer-diameter dimension of the protruding portion 16. Thus, the protruding portion 16 is press-fitted into a space inside the fixing portion 25, which has an inner-diameter dimension smaller than the outer-diameter dimension of the protruding portion 16, specifically, a space surrounded by the ribs 26.

Specifically, when the motor case 11 and the motor cover 21 are fixed together, the press-fitting between the protruding portion 16 having a round-columnar shape and the fixing portion 25 having a cylindrical shape is started at a portion where the inner diameter of the fixing portion 25 is smaller than the outer diameter of the protruding portion 16 (portion corresponding to the space surrounded by the ribs 26). After that, the protruding portion 16 is inserted into the fixing portion 25 until an end surface of the base portion 15, which corresponds to an abutment surface 17 of the motor case 11, and a distal end of the fixing portion 25 of the motor cover 21 abut against each other. Thus, a position of the motor case 11 and a position of the motor cover 21 are fixed.

Further, under this state, a press-fit area of the protruding portion 16 and the fixing portion 25 and press-fit areas of the motor terminals 13 and the cover-side terminals 24 are entirely covered with the motor cover 21 and the case main body 14 (more specifically, the base portion 15) of the motor case 11. Specifically, while the motor case 11 and the motor cover 21 are being fixed together and after the fixing between the motor case 11 and the motor cover 21 is completed, the press-fit areas are covered. In other words, under a state in which the motor cover 21 is fixed to the motor case 11, the motor cover 21 has a shape (bottomed cylindrical shape) that covers the protruding portion 16, the fixing portion 25, the motor terminals 13, and the cover-side terminals 24 from an outside. Specifically, the motor cover 21 includes a main body portion 29 (lid portion) having a bottomed cylindrical shape. The fixing portion 25 and the motor terminals 13 are located inside the main body portion 29.

In the embodiment, the motor device 4 has (two) press-fit areas for an electrical connection of the motor 12, which are defined by the motor terminals 13 and the cover-side terminals 24, and one press-fit area for a mechanical fixation of the motor 12, which is defined by the protruding portion 16 made of a resin and the fixing portion 25. Specifically, in the embodiment, each of the motor cover 21 and the motor case 11 has a plurality of (a total of three) press-fit portions including two terminal press-fit portions and one resin press-fit portion.

Thus, when the motor cover 21 is mounted to the motor case 11, the press-fitting of the terminal press-fit portions (terminal connection portions) and the press-fitting of the resin press-fit portions (mechanical connection portion) are performed. At this time, in order to monitor press-fitted states of the terminal press-fit portions, a relationship (characteristic) between a pressing load on the motor cover 21 and the motor case 11 and the amount of change in pressing position (stroke) is detected by a measurement machine. Specifically, a "load-to-stroke" characteristic is detected by a measurement machine, and it is determined based on the characteristic whether the press-fitted states of the terminal press-fit portions are appropriate or not.

Now, it is considered a case in which, for example, a height of the terminal press-fit portions and a height of the resin press-fit portions are the same. In this case, a press-fit timing for the terminal press-fit portions and a press-fit timing for the resin press-fit portions may be simultaneous in a manufacturing step (assembly step) of mounting the motor cover onto the motor case, with the result that a determination of whether or not the connections are correctly achieved based on the load cannot be made.

Thus, in the embodiment, a height dimension of the terminal press-fit portions (connecting areas of the motor terminals 13 and the cover-side terminals 24) for electrical connections and a height dimension of the resin press-fit portions (connecting area of the protruding portion 16 and the fixing portion 25) for a mechanical connection are set different from each other. Specifically, in order to determine whether or not connecting states of the electrical connection areas are appropriate, a time of starting electrical bonding (press-fitting of the terminal components) and a time of starting mechanical bonding (press-fitting of the resin member) are each set to have a phase. In this manner, it can be determined based on the load whether or not the connecting states are appropriate.

Figure 3:
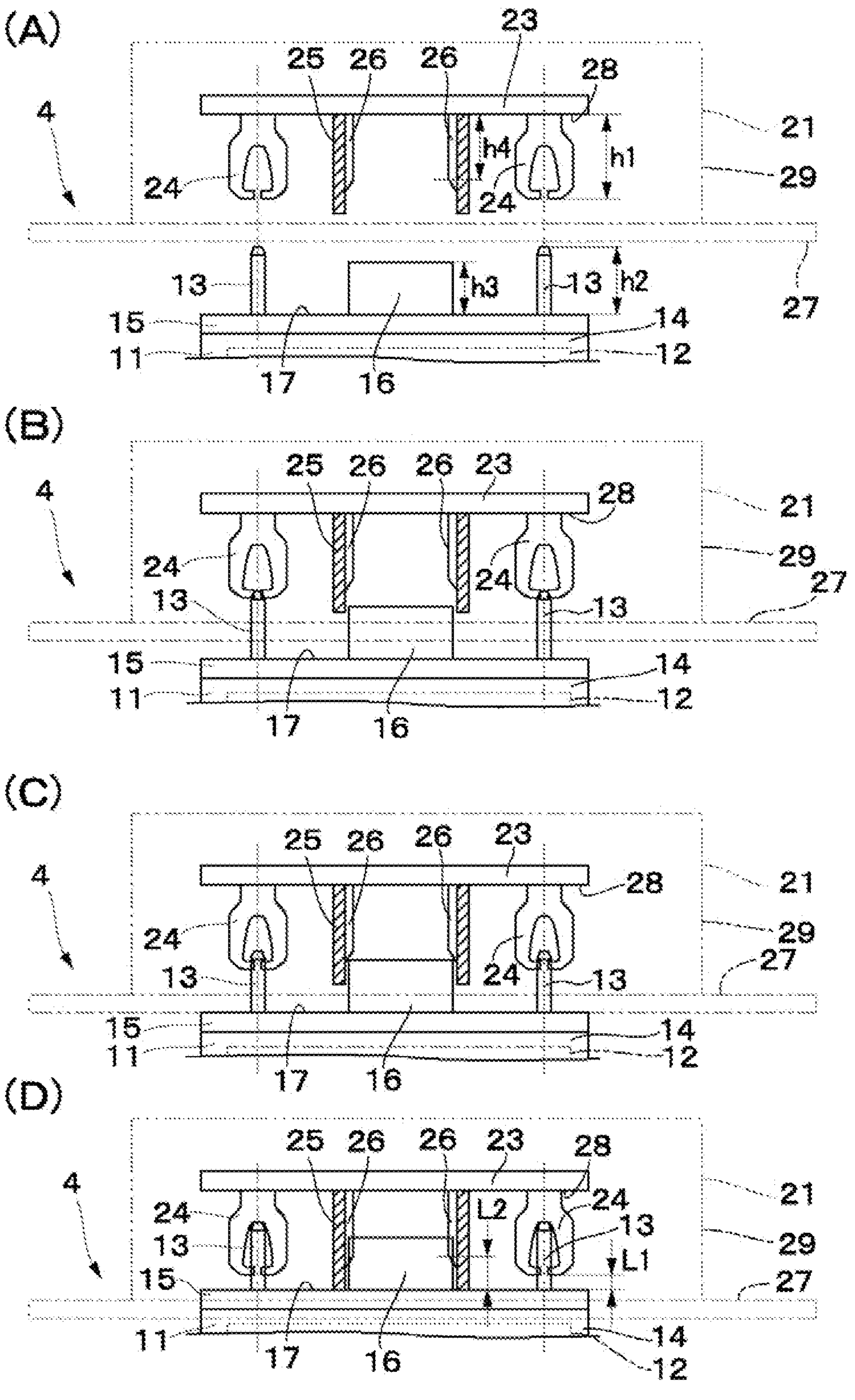
FIG. 3 are partially sectional outline views for illustrating fixing of the motor case (first housing) and the motor cover (second housing) to each other in the order of (A) to (D) in a stepwise manner.

Thus, as illustrated in FIGS. 3, in the embodiment, connecting positions for the terminal press-fit portions (the motor terminals 13, the cover-side terminals 24) are set higher than a point at which the press-fitting of the resin press-fit portions (the protruding portion 16, the fixing portion 25) is started. With this setting, the timing of connecting (press-fitting) the terminal press-fit portions (the motor terminals 13, the cover-side terminals 24) is set earlier than the timing of connecting (press-fitting) the resin press-fit portions (the protruding portion 16, the fixing portion 25). As a result, as shown in FIG. 4, after the terminal press-fit portions (the motor terminals 13, the cover-side terminals 24) are press-fitted, the resin press-fit portions (the protruding portion 16, the fixing portion 25) are press-fitted. Thus, it can be checked based on the load that the terminal press-fit portions (the motor terminals 13, the cover-side terminals 24) are correctly connected and the resin press-fit portions (the protruding portion 16, the fixing portion 25) are correctly connected in the manufacturing step (assembly step).

Specifically, in the embodiment, press-fitted states between the motor terminals 13 and the cover-side terminals 24 are inspected based on a relationship between "the stroke being the amount of movement of the motor cover 21 in an extending direction of the motor terminals 13" and "a load generated at the time of the stroke". In this case, a relationship between the load and the position (stroke) when the connections are correctly achieved and a relationship between the load and the position (stroke) when the connections are not correctly achieved are acquired in advance through an experiment or an analysis so as to set a load threshold value for a predetermined stroke range. Examples of the incorrect connection include a case in which the motor terminal 13 is disengaged from a gap of the cover-side terminal 24 and slips over an outer side of the cover-side terminal 24. Then, in the manufacturing step (assembly step), when the load becomes smaller or larger than a predetermined range for a stroke falling within a predetermined range, it is determined that the connections are not correctly achieved. When the load falls within the predetermined range for the stroke falling within the predetermined range, it is determined that the connections are correctly achieved.

When a phase of "press-fitting between the protruding portion 16 and the fixing portion 25, which are mechanical press-fit portions" and a phase of "press-fitting between the motor terminals 13 and the cover-side terminals 24, which are electrical press-fit portions" are close to each other, a measured load is a sum of loads. Thus, sensitivity of determination may be lowered. Hence, in the embodiment, a stroke for "press-fitting between the motor terminals 13 and the cover-side terminals 24" is set shorter than a stroke for "press-fitting between the protruding portion 16 and the fixing portion 25" so as to accurately measure a press-fit load on the motor terminals 13 and the cover-side terminals 24. In this manner, the "press-fitting between the motor terminals 13 and the cover-side terminals 24" is set so as to be first started.

In general, the press-fit load is smaller for the electrical connections (press-fitting of the terminals) than for the mechanical connection (press-fitting for fixing). Thus, in the embodiment, the press-fitting for the electrical connections is started with a short stroke prior to the press-fitting for the mechanical connection. Specifically, as shown in FIG. 4, an electrical connection terminal press-fitting start point for the motor terminals 13 and the cover-side terminals 24 is set earlier than a mechanical holding and press-fitting start point for the protruding portion 16 and the fixing portion 25. As a result, both of the press-fit load for the electrical connection areas (the motor terminals 13, the cover-side terminals 24) and the press-fit load for the mechanical connection area (the protruding portion 16, the fixing portion 25) can be precisely detected, and improper mounting can more precisely be detected based on the loads.

In order to achieve the press-fitting order described above, dimensions of heights and a depth are set as follows in the embodiment. Specifically, as illustrated in FIG. 3(A), a height from an abutment surface 28 of the motor cover 21 to connecting portions of the cover-side terminals 24 (specifically, positions at which the connections to the motor terminals 13 are started) is represented by "h1", a height from the abutment surface 17 of the motor case 11 (base portion 15) to connecting portions of the motor terminals 13 (specifically, positions at which the connection to the cover-side terminals 24 is started) is represented by "h2", a height from the abutment surface 17 of the motor case 11 (base portion 15) to a connecting portion of the protruding portion 16 (specifically, a position at which the connection to the fixing portion 25 is started) is represented by "h3", and a depth from the abutment surface 28 of the motor cover 21 to a connecting portion of the fixing portion 25 (specifically, a position at which the connection to the protruding portion 16 is started) is represented by "h4".

In this case, Expression 1 is satisfied so as to achieve a dimensional relationship that allows the protruding portion 16 and the fixing portion 25 to be press-fitted together after the motor terminals 13 and the cover-side terminals 24 are press-fitted together. Specifically, values in Expression 1 are set so that a left-hand side becomes larger than 0.

$$(h1-h4)+(h2-h3)>0 \qquad \text{[Math. 1]}$$

For example, the height "h1" is set to 8 mm, the height "h2" is set to 5 mm, the height "h3" is set to 4 mm, and the depth "h4" is set to 5 mm. In this case, after the motor terminals 13 and the cover-side terminals 24 are press-fitted together over 4 mm, the press-fitting between the protruding portion 16 and the fixing portion 25 is started. In FIG. 4, there is shown one example of the relationship between the stroke and the load when the above-mentioned mounting is performed.

As described above, in the embodiment, when the motor case 11 and the motor cover 21 are fixed to each other, the timing of starting the press-fitting between the motor terminals 13 and the cover-side terminals 24 and the timing of starting the connection between the protruding portion 16 and the fixing portion 25 are set different from each other. Thus, in the embodiment, as illustrated in FIG. 3(D), the cover-side terminals 24 of the motor cover 21 are electrically press-fitted over and fixed to the motor terminals 13 at a first position. The first position is separate from the base portion 15 by a first length L1 in an extending direction of the motor terminals 13 of the motor case 11. Meanwhile, the fixing portion 25 of the motor cover 21 is press-fitted over and fixed to the protruding portion 16 at a second position. The second position is separate from the base portion 15 by a second length L2 being different from the first length L1 in the extending direction of the motor terminals 13 of the motor 11. In the embodiment, the second length L2 is longer than the first length L1 (L1<L2).

The electric brake device 1 and the motor device 4 according to the embodiment have the configurations described above. Next, a method of manufacturing the motor device 4 is described.

The motor device 4 has the following three steps. In a first step, the motor case 11 is prepared. The motor case 11 includes the motor 12, the motor terminals 13 connected to the motor 12, and the case main body 14 in which the motor 12 is housed. The case main body 14 includes the base portion 15 and the protruding portion 16. The motor terminals 13 extend from the base portion 15. The protruding portion 16 protrudes from the base portion 15. In the first step, the motor case 11 described above is prepared.

In a second step, the motor cover 21 is prepared. The motor cover 21 includes the cover-side terminals 24 and the fixing portion 25. The cover-side terminals 24 are electrically fixed to the motor terminals 13 of the motor case 11. The fixing portion 25 is press-fitted over and fixed to the protruding portion 16 of the case main body 14 of the motor case 11. In the second step, the motor cover 21 described above is prepared. The order of the first step and the second step (preparation steps) may be as follows. Specifically, the first step may be followed by the second step, the second step may be followed by the first step, or the first step and the second step may be carried out in parallel.

In a third step, the motor case 11 and the motor cover 21 are fixed to each other. In this case, the timing of press-fitting the motor terminals 13 into the cover-side terminals 24 in the extending direction of the motor terminals 13 is referred to as "first press-fit timing". Further, the timing of press-fitting the protruding portion 16 of the motor case 11 into the fixing portion 25 of the motor cover 21 in the extending direction of the motor terminals 13 is referred to as "second press-fit timing". In the third step, the motor case 11 and the motor cover 21 are fixed to each other so that the first press-fit timing and the second press-fit timing are set different from each other.

Figure 4:
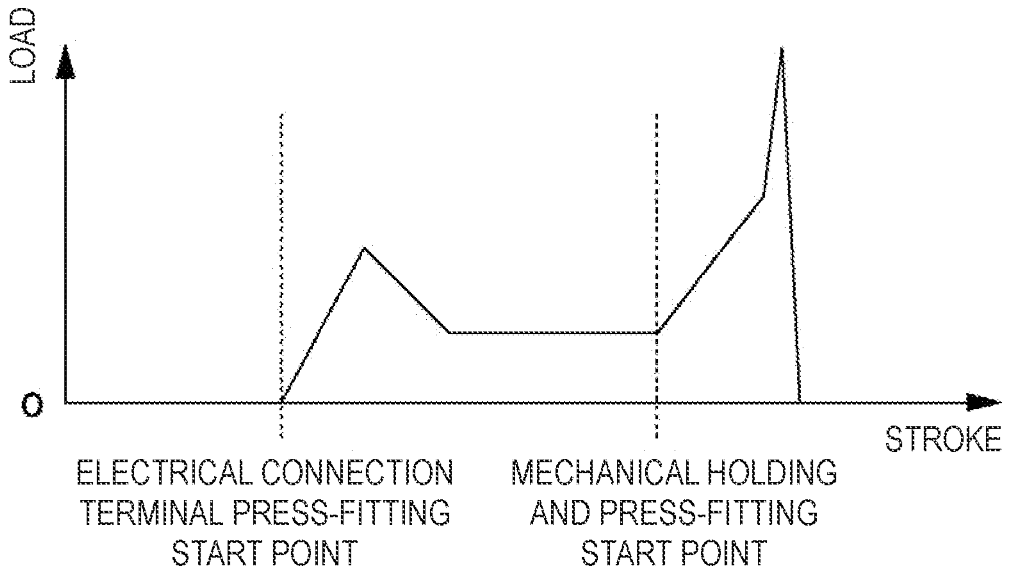
FIG. 4 is a characteristic graph for showing an example of a relationship between a stroke and a load when the motor case (first housing) and the motor cover (second housing) are fixed to each other.
Figure 5:
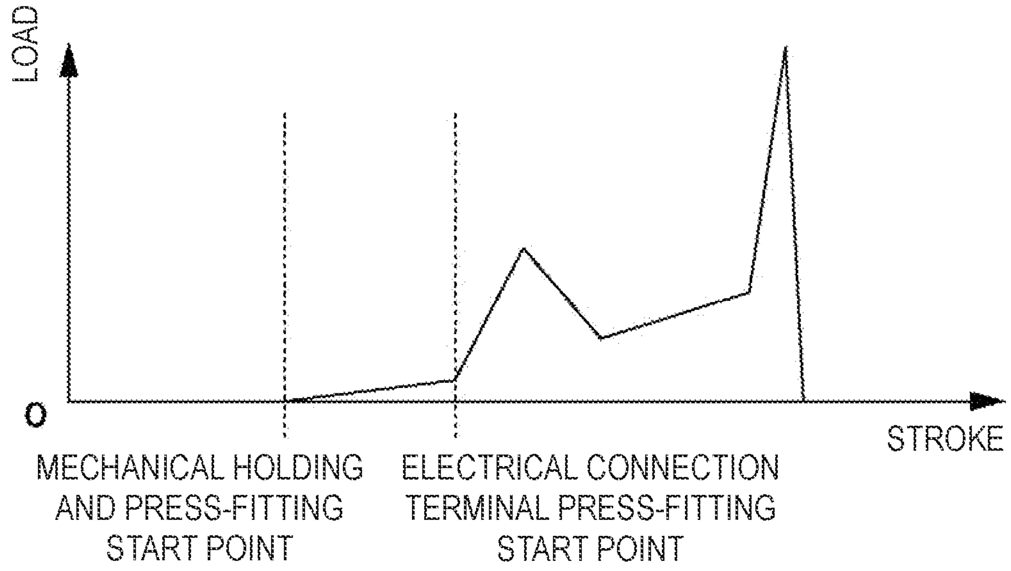
FIG. 5 is a characteristic graph for showing an example of a relationship between a stroke and a load when a motor case (first housing) and a motor cover (second housing) of a modification example are fixed to each other.

In the embodiment, in this case, as shown in FIG. 4, the first press-fit timing (press-fit start time for the motor terminals 13 and the cover-side terminals 24) at which the electrical terminal connections are started is earlier than the second press-fit timing (press-fit start time for the protruding portion 16 of the motor case 11 and the fixing portion 25 of the motor cover 21) at which the mechanical holding and connection are started. Further, in the third step, the press-fitted states between the motor terminals 13 and the cover-side terminals 24 are inspected based on the relationship between the "stroke corresponding to the amount of movement of the motor cover 21 (the amount of movement in the extending direction of the motor terminals 13)" and the "load generated at the time of the stroke" as shown in FIG. 4.

According to the embodiment described above, accuracy of the determination of the connecting states of the electrical connection terminals (the motor terminals 13, the cover-side terminals 24) based on the load is improved. As a result, accuracy of detection of a defective item among the electrical connection terminals and whether or not wrong mounting has occurred during the manufacturing step is improved, and thus quality of products is improved. Further, a related-art structure requires expensive facilities for, for example, non-destructive testing (X-ray inspection device) in order to check the connecting states of the electrical connection terminals, and thus investments to the facilities may increase. Meanwhile, in the embodiment, expensive facilities described above are not required, and thus reduction in cost can be achieved. Further, the connecting states of the electrical connection terminals can be managed not visually but based on the load in the manufacturing step. Thus, the electrical connection terminals are not required to have a structure that is observable from an outside. As a configuration of the motor cover 21, the cover-side terminals 24 and a covering member (lid member) that covers the cover-side terminals 24 can be integrally formed. In this manner, a reduction in the number of components can achieve reduction in cost and downsizing of products.

As described above, according to the embodiment, the motor cover 21 includes the cover-side terminals 24 and the fixing portion 25. The cover-side terminals 24 are electrically press-fitted over and fixed to the motor terminals 13 of the motor case 11 at the first position that is separate from the base portion 15 by the first length L1. The fixing portion 25 is press-fitted over and fixed to the protruding portion 16 of the motor case 11 at the second position that is separate from the base portion 15 by the second length L2. Thus, when the motor case 11 and the motor cover 21 are fixed to each other, the "timing (first press-fit timing) of starting the press-fitting between the motor terminals 13 and the cover-side terminals 24" and the "timing (second press-fit timing) of starting the press-fitting between the protruding portion 16 and the fixing portion 25" can be set different from each other.

As a result, even when the press-fitting (connection) cannot be monitored visually, specifically, even when the press-fit portions (connecting portions) are covered with the motor case 11 corresponding to the first housing and the motor cover 21 corresponding to the second housing at the time of press-fitting (connection), it can be determined whether or not the press-fitting (connection) has been appropriately achieved. In other words, when the connection is performed in two areas having different functions, specifically, "the motor terminals 13 and the cover-side terminals 24, which correspond to the electrical connection areas" are connected to each other and "the protruding portion 16 and the fixing portion 25, which correspond to the mechanical connection area" are connected to each other, it can be determined whether or not the press-fitted states (connecting states, fitted states) of the electrical connection areas (the motor terminals 13, the cover-side terminals 24) are appropriate. As a result, degradation of the press-fitted states (connecting states, fitted states) of the electrical connection areas (the motor terminals 13, the cover-side terminals 24) can be suppressed.

According to the embodiment, the second length L2 is longer than the first length L1. Thus, for fixing the motor case 11 and the motor cover 21 to each other, the press-fitting between the protruding portion 16 and the fixing portion 25 can be set so as to be started after the press-fitting between the motor terminals 13 and the cover-side terminals 24 is started. In addition, according to the embodiment, each of the cover-side terminals 24 is an alligator terminal. Thus, the cover-side terminals 24, each being an alligator terminal, can be press-fitted over and fixed to the motor terminals 13 connected to the motor 12 (coil).

According to the embodiment, the press-fitted states between the motor terminals 13 and the cover-side terminals 24 can be inspected based on the relationship between "the stroke of the motor cover 21" and "the load generated at the time of the stroke". Thus, it can be determined, based on the relationship between the stroke and the load, whether or not the press-fitted states (connecting states, fitted states) of the electrical connection areas (the motor terminals 13, the cover-side terminals 24) are appropriate.

In the embodiment, there has been described, as an example, the case in which the press-fitting for the electrical connection areas (the motor terminals 13, the cover-side terminals 24) is first performed and the press-fitting for the mechanical connection area (the protruding portion 16, the fixing portion 25) is then performed. However, the order of the press-fitting is not limited thereto. For example, when the press-fit load on the electrical connection areas is high and the press-fit load on the mechanical connection area is low, the order of press-fitting may be such that the press-fitting for the mechanical connection area is first performed and then, the press-fitting for the electrical connection areas is performed. Specifically, when the motor case (first housing) and the motor cover (second housing) are fixed to each other, the mechanical holding and press-fitting start point may precede the electrical connection terminal press-fitting start point.

Specifically, although illustration is omitted, the second length L2 being the length of the fixing portion from the base portion may be set shorter than the first length L1 being the length from the base portion of the electrical connection portions (cover-side terminals) under a state in which the motor case (first housing) and the motor cover (second housing) are fixed to each other. In other words, in the third step of fixing the motor case (first housing) and the motor cover (second housing) to each other, the first press-fit timing of press-fitting the terminals (motor terminals) into the electrical connection portions (cover-side terminals) may be set later than the second press-fit timing of press-fitting the protruding portion into the fixing portion. Even in such a modification example, the degradation of the fitted states of the terminals (motor terminals) and the electrical connection portions (cover-side terminals) can be suppressed.

In the embodiment, there has been described, as an example, the case in which the protruding portion 16 has a round-columnar shape and the fixing portion 25 has a cylindrical shape. However, the shapes of the protruding portion 16 and the fixing portion 25 are not limited thereto. For example, the protruding portion may have a cylindrical shape, and the fixing portion may have a round-columnar shape. Further, not only a cylinder and a round column but also a tube or a column with various sectional shapes may be used as the protruding portion and the fixing portion. Further, the protruding portion and the fixing portion may be other than a tube and a column and may be any engagement mechanism having a shape with, for example, a protrusion and a recess that allows bonding (connection) through mechanical press-fitting. Various mechanical bonding configurations (engagement configurations) can be used.

In the embodiment, there has been described, as an example, the case in which alligator terminals are used as the cover-side terminals 24 corresponding to the electrical connection portions. However, the electrical connection portions are not limited thereto, and may be terminals, for example, other than alligator terminals. Specifically, members (terminals) having various shapes can be used as the terminals of the first housing (motor case) and the electrical connection portions of the second housing (motor cover) as long as, for example, the terminals and the electrical connection portions can be electrically fixed to each other and are at least partially brought into abutment against each other without a gap (without backlash) to achieve press-fitting at the time of fixing (connection).

In the embodiment, the motor device 4 for forming the electric brake device 1 has been described as an example of the motor device. However, the motor device is not limited thereto. The motor device can be used as, for example, a motor device for forming various kinds of electromechanical devices other than the electric brake device, such as a motor device for forming an electrical steering device.

In the embodiment, the motor device including the motor has been described as an example of the terminal connection mechanism. Specifically, in the embodiment, the motor device including the motor case 11 corresponding to the first housing and the motor cover 21 corresponding to the second housing has been described as an example of the terminal connection mechanism. However, the terminal connection mechanism is not limited thereto. The terminal connection mechanism may be used as a terminal connection mechanism for various kinds of electric devices other than the motor device, for example, a solenoid device.

In this case, the terminal connection mechanism includes the first housing and the second housing. The first housing includes the terminals, the base portion from which the terminals extend, and the protruding portion protruding from the base portion. The second housing includes the electrical connection portions to be electrically connected to the terminals and the fixing portion to be press-fitted over and fixed to the protruding portion. In this case, the electrical connection portions are electrically press-fitted over and fixed to the terminals at the first position that is separate from the base portion by the first length in the extending direction of the terminals. The fixing portion is press-fitted over and fixed to the protruding portion at the second position that is separate from the base portion by the second length being different from the first length in the extending direction of the terminals. Then, for example, the second length is set longer than the first length. Alternatively, for example, the second length is set shorter than the first length.

Further, the terminal connection method includes the first step of preparing the first housing, the second step of preparing the second housing, and the third step of fixing the first housing and the second housing to each other. In this case, in the third step, the first housing and the second housing are fixed to each other so that "the first press-fit timing of press-fitting the terminals into the electrical connection portions in the extending direction of the terminals" and "the second press-fit timing of press-fitting the protruding portion into the fixing portion in the extending direction of the terminals" are set different from each other. The first press-fit timing is set, for example, earlier than or later than the second press-fit timing.

For example, the following aspects are conceivable as the motor device, the method of manufacturing a motor device, the terminal connection mechanism, the terminal connection method, and the electric brake device according to the embodiment described above.

As a first aspect, there is provided a motor device, including: a motor case; and a motor cover, wherein the motor case includes: a motor: a terminal connected to the motor; and a case main body in which the motor is housed, the case main body including a base portion from which the terminal extends and a protruding portion protruding from the base portion, and wherein the motor cover includes: an electrical connection portion that is electrically press-fitted over and fixed to the terminal at a first position being separate from the base portion by a first length in an extending direction of the terminal; and a fixing portion that is press-fitted over and fixed to the protruding portion at a second position being separate from the base portion by a second length being different from the first length in the extending direction of the terminal.

According to the first aspect, when the motor case and the motor cover are fixed to each other, "the timing of starting the press-fitting between the terminals and the electrical connection portions" and "the timing of starting the press-fitting between the protruding portion and the fixing portion" can be set different from each other. As a result, even when the press-fitting (connection) cannot be monitored visually, it can be determined whether or not the press-fitting (connection) has been appropriately achieved. In other words, when the connection is performed in two areas having different functions, specifically, when "the terminals and the electrical connection portions, which correspond to the electrical connection areas" are connected to each other and "the protruding portion and the fixing portion, which correspond to the mechanical connection area" are connected to each other, it can be determined whether or not the press-fitted states (connecting states, fitted states) of the electrical connection areas (terminals and electrical connection portions) are appropriate. As a result, the degradation of the press-fitted states (connecting states, fitted states) of the electrical connection areas (terminals and electrical connection portions) can be suppressed.

As a second aspect, in the first aspect, the second length is set longer than the first length. According to the second aspect, when the motor case and the motor cover are fixed to each other, the press-fitting between the protruding portion and the fixing portion can be started after the start of the press-fitting between the terminals and the electrical connection portions.

As a third aspect, in the first aspect, the second length is set longer than the first length. According to the third aspect, when the motor case and the motor cover are fixed to each other, the press-fitting between the terminals and the electrical connection portions can be started after the start of the press-fitting between the protruding portion and the fixing portion.

As a fourth aspect, in the first aspect, the electrical connection portion is an alligator terminal. According to the fourth aspect, the alligator terminals (electrical connection portions) can be press-fitted over and fixed to the terminals connected to the motor.

As a fifth aspect, there is provided a method of manufacturing a motor device, the method including: a first step of preparing a motor case, the motor case including: a motor; a terminal connected to the motor: a case main body in which the motor is housed, the case main body including a base portion from which the terminal extends and a protruding portion protruding from the base portion; a second step of preparing a motor cover, the motor cover including: an electrical connection portion to be electrically fixed to the terminal; and a fixing portion to be press-fitted over and fixed to the protruding portion; and a third step of fixing the motor case and the motor cover to each other so that a first press-fit timing of press-fitting the terminal into the electrical connection portion in an extending direction of the terminal and a second press-fit timing of press-fitting the protruding portion into the fixing portion in the extending direction of the terminal are set different from each other.

According to the fifth aspect, when the motor case and the motor cover are fixed to each other. "the first press-fit timing of starting the press-fitting between the terminals and the electrical connection portions" and "the second press-fit timing of starting the press-fitting between the protruding portion and the fixing portion" are different from each other. As a result, even when the press-fitting (connection) cannot be monitored visually, it can be determined whether or not the press-fitting (connection) has been appropriately achieved. In other words, when the connection is performed in two areas having different functions, specifically, when "the terminals and the electrical connection portions, which correspond to the electrical connection areas" are connected to each other and "the protruding portion and the fixing portion, which correspond to the mechanical connection area" are connected to each other, it can be determined whether or not the press-fitted states (connecting states, fitted states) of the electrical connection areas (terminals and electrical connection portions) are appropriate. As a result, the degradation of the press-fitted states (connecting states, fitted states) of the electrical connection areas (terminals and electrical connection portions) can be suppressed.

As a sixth aspect, in the fifth aspect, in the third step, the first press-fit timing is set earlier than the second press-fit timing. According to the sixth aspect, when the motor case and the motor cover are fixed to each other, the press-fitting between the protruding portion and the fixing portion can be started after the start of the press-fitting between the terminals and the electrical connection portions.

As a seventh aspect, in the fifth aspect, in the third step, the first press-fit timing is set later than the second press-fit timing. According to the seventh aspect, when the motor case and the motor cover are fixed to each other, the press-fitting between the terminals and the electrical connection portions can be started after the start of the press-fitting between the protruding portion and the fixing portion.

As an eighth aspect, in the fifth aspect, in the third step, a press-fitted state of the terminal and the electrical connection portion is inspected based on a relationship between a stroke being a movement amount of the motor cover in the extending direction of the terminal and a load generated at the time of the stroke. According to the eighth aspect, it can be determined, based on the relationship between the stroke and the load, whether or not the press-fitted states (connecting states, fitted states) of the electrical connection areas (the terminals and the electrical connection portions) are appropriate.

As a ninth aspect, there is provided a terminal connection mechanism, including: a first housing; and a second housing, wherein the first housing includes: a terminal: a base portion from which the terminal extends; and a protruding portion protruding from the base portion, and wherein the second housing includes: an electrical connection portion that is electrically press-fitted over and fixed to the terminal at a first position being separate from the base portion by a first length in an extending direction of the terminal; and a fixing portion that is press-fitted over and fixed to the protruding portion at a second position being separate from the base portion by a second length being different from the first length in the extending direction of the terminal.

According to the ninth aspect, when the first housing and the second housing are fixed to each other, "the timing of starting the press-fitting between the terminals and the electrical connection portions" and "the timing of starting the press-fitting between the protruding portion and the fixing portion" can be set different from each other. As a result, even when the press-fitting (connection) cannot be monitored visually, it can be determined whether or not the press-fitting (connection) has been appropriately achieved. In other words, when the connection is performed in two areas having different functions, specifically, when "the terminals and the electrical connection portions, which correspond to the electrical connection areas" are connected to each other and "the protruding portion and the fixing portion, which correspond to the mechanical connection area" are connected to each other, it can be determined whether or not the press-fitted states (connecting states, fitted states) of the electrical connection areas (terminals and electrical connection portions) are appropriate. As a result, the degradation of the press-fitted states (connecting states, fitted states) of the electrical connection areas (terminals and electrical connection portions) can be suppressed.

As a tenth aspect, there is provided a terminal connection method, the method including: a first step of preparing a first housing, the first housing including: a terminal; a base portion from which the terminal extends; and a protruding portion protruding from the base portion: a second step of preparing a second housing, the second housing including: an electrical connection portion to be electrically fixed to the terminal; and a fixing portion to be press-fitted over and fixed to the protruding portion; and a third step of fixing the first housing and the second housing to each other so that a first press-fit timing of press-fitting the terminal into the electrical connection portion in an extending direction of the terminal and a second press-fit timing of press-fitting the protruding portion into the fixing portion in the extending direction of the terminal are set different from each other.

According to the tenth aspect, when the first housing and the second housing are fixed to each other. "the first press-fit timing of starting the press-fitting between the terminals and the electrical connection portions" and "the second press-fit timing of starting the press-fitting between the protruding portion and the fixing portion" are different from each other. As a result, even when the press-fitting (connection) cannot be monitored visually, it can be determined whether or not the press-fitting (connection) has been appropriately achieved. In other words, when the connection is performed in two areas having different functions, specifically, when "the terminals and the electrical connection portions, which correspond to the electrical connection areas" are connected to each other and "the protruding portion and the fixing portion, which correspond to the mechanical connection area" are connected to each other, it can be determined whether or not the press-fitted states (connecting states, fitted states) of the electrical connection areas (terminals and electrical connection portions) are appropriate. As a result, the degradation of the press-fitted states (connecting states, fitted states) of the electrical connection areas (terminals and electrical connection portions) can be suppressed.

As an eleventh aspect, there is provided an electric brake device including the motor device of the first aspect. According to the eleventh aspect, even when the press-fitting (connections) for the electrical connection areas (terminals and electrical connection portions) cannot be monitored visually at the time of fixing of the motor case and the motor cover to form the motor device of the electric brake device, it can be determined whether or not the press-fitted states (connecting states, fitted states) of the electrical connection areas (terminals and electrical connection portions) are appropriate. As a result, the degradation of the press-fitted states (connecting states, fitted states) of the electrical connection areas (terminals and electrical connection portions) of the electric brake device (motor device) can be suppressed.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2021-099232 filed on Jun. 15, 2021. All disclosed contents including Specification, Scope of Claims, Drawings, and Abstract of Japanese Patent Application No. 2021-099232 filed on Jun. 15, 2021 are incorporated herein by reference in their entirety.

REFERENCE SIGNS LIST

1: electric brake device, 4: motor device (terminal connection mechanism), 11: motor case (first housing), 12: motor, 13: motor terminal (terminal), 14: case main body, 15: base portion, 16: protruding portion, 21: motor cover (second housing), 24: cover-side terminal (electrical connection portion), 25: fixing portion

The invention claimed is:

1. A motor device, comprising:

a motor case; and a motor cover, wherein the motor case includes:

a motor;

a motor terminal connected to the motor; and a case main body in which the motor is housed, the case main body including a base portion from which the motor terminal extends and a protruding portion protruding from the base portion, and wherein the motor cover includes:

a cover-side terminal as an electrical connection portion that is electrically press-fitted over and fixed to the motor terminal at a first position which is separate from the base portion by a first length in an extending direction of the motor terminal; and a fixing portion that constitutes a mechanical connection portion press-fitted over and fixed to the protruding portion at a second position which is separate from the base portion by a second length which is different from the first length in the extending direction of the motor terminal, wherein the first length and the second length are configured such that a timing of starting press-fitting for an electrical connection between the motor terminal and the cover-side terminal is earlier than a timing of starting press-fitting for a mechanical connection of the protruding portion to the fixing portion.

2. The motor device according to claim 1, wherein the second length is longer than the first length.

3. The motor device according to claim 1, wherein the electrical connection portion is an alligator terminal.

4. A method of manufacturing a motor device, the method comprising:

a first step of preparing a motor case, the motor case including:

a motor;

a terminal connected to the motor;

a case main body in which the motor is housed, the case main body including a base portion from which the terminal extends and a protruding portion protruding from the base portion;

a second step of preparing a motor cover, the motor cover including:

an electrical connection portion to be electrically fixed to the terminal; and a fixing portion that constitutes a mechanical connection portion to be press-fitted over and fixed to the protruding portion; and a third step of fixing the motor case and the motor cover to each other so that a first press-fit timing which is a start time of press-fitting the terminal into the electrical connection portion in an extending direction of the terminal and a second press-fit timing which is a start time of press-fitting the protruding portion into the fixing portion in the extending direction of the terminal are different from each other, wherein, in the third step, the first press-fit timing is earlier than the second press-fit timing.

5. The method according to claim 4, further comprising, in the third step, inspecting a press-fitted state of the terminal and the electrical connection portion based on a relationship between a stroke which is a movement amount of the motor cover in the extending direction of the terminal and a load generated at a time of the stroke.

* * * * *